United States Patent
Zheng et al.

(10) Patent No.: US 11,448,825 B2
(45) Date of Patent: Sep. 20, 2022

(54) METHODS FOR FORMING SIDE-PUMPED OPTICAL FIBER COMBINERS

(71) Applicant: AFL Telecommunications LLC, Duncan, SC (US)

(72) Inventors: Wenxin Zheng, Moore, SC (US); Mohamed Amine Jebali, Greer, SC (US); Gongwen Zhu, Duncan, SC (US)

(73) Assignee: AFL Telecommunications LLC, Duncan, SC (US)

( * ) Notice: Subject to any disclaimer, the term of this patent is extended or adjusted under 35 U.S.C. 154(b) by 640 days.

(21) Appl. No.: 16/225,713

(22) Filed: Dec. 19, 2018

(65) Prior Publication Data

US 2019/0187381 A1 Jun. 20, 2019

Related U.S. Application Data

(60) Provisional application No. 62/607,703, filed on Dec. 19, 2017.

(51) Int. Cl.
*G02B 6/28* (2006.01)
*G02B 6/245* (2006.01)

(52) U.S. Cl.
CPC .......... *G02B 6/2856* (2013.01); *G02B 6/245* (2013.01); *G02B 6/2852* (2013.01); *Y10T 29/49194* (2015.01); *Y10T 29/49195* (2015.01)

(58) Field of Classification Search
CPC .... G02B 6/2852; G02B 6/2856; G02B 6/245; Y10T 29/49194; Y10T 29/49195
See application file for complete search history.

(56) References Cited

U.S. PATENT DOCUMENTS

| | | | | |
|---|---|---|---|---|
| 4,712,858 | A * | 12/1987 | Presby | G02B 6/2852 264/1.27 |
| 6,370,297 | B1 * | 4/2002 | Hakimi | G02B 6/2852 359/341.1 |
| 9,547,121 | B2 | 1/2017 | Hou et al. | |
| 2008/0219621 | A1 * | 9/2008 | Aldeghi | G02B 6/2852 385/32 |
| 2012/0201502 | A1 | 8/2012 | Wiley | |
| 2015/0023639 | A1 | 1/2015 | Wiley | |

FOREIGN PATENT DOCUMENTS

| | | | | |
|---|---|---|---|---|
| JP | 2012088733 A * | 5/2012 | | G02B 6/2552 |
| WO | WO2016/191127 A1 | 12/2016 | | |

OTHER PUBLICATIONS

Keiron Bovd, et al.; $CO_2$ laser-fabricated cladding light strippers for high-power fiber lasers and amplifiers; Applied Optics; vol. 55, No. 11, Apr. 10, 2016; pp. 2915-2920.

* cited by examiner

*Primary Examiner* — A. Dexter Tugbang
(74) *Attorney, Agent, or Firm* — Dority & Manning, P.A.

(57) ABSTRACT

A method for forming a side-pumped optical fiber combiner includes ablating a cladding of a signal fiber to form an angled notch in the cladding. The signal fiber includes a core and the cladding surrounding the core. The method further includes inserting a cladding-free end of a pump fiber into the angled notch. The pump fiber includes a core and a cladding, the cladding-free end including the core of the pump fiber and free from the cladding of the pump fiber. The method further includes fusing the cladding-free end to the signal fiber.

20 Claims, 5 Drawing Sheets

FIG. 2

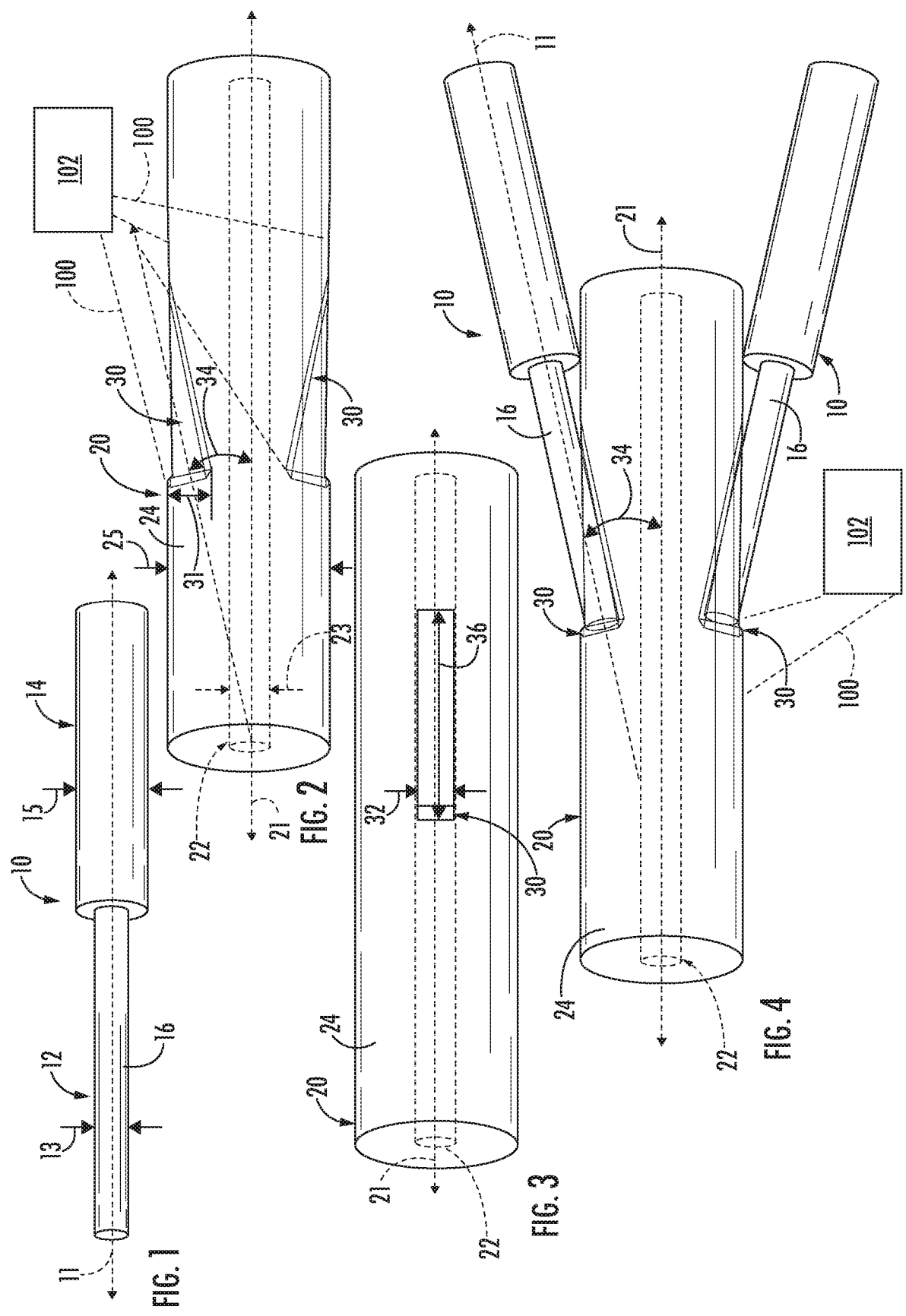

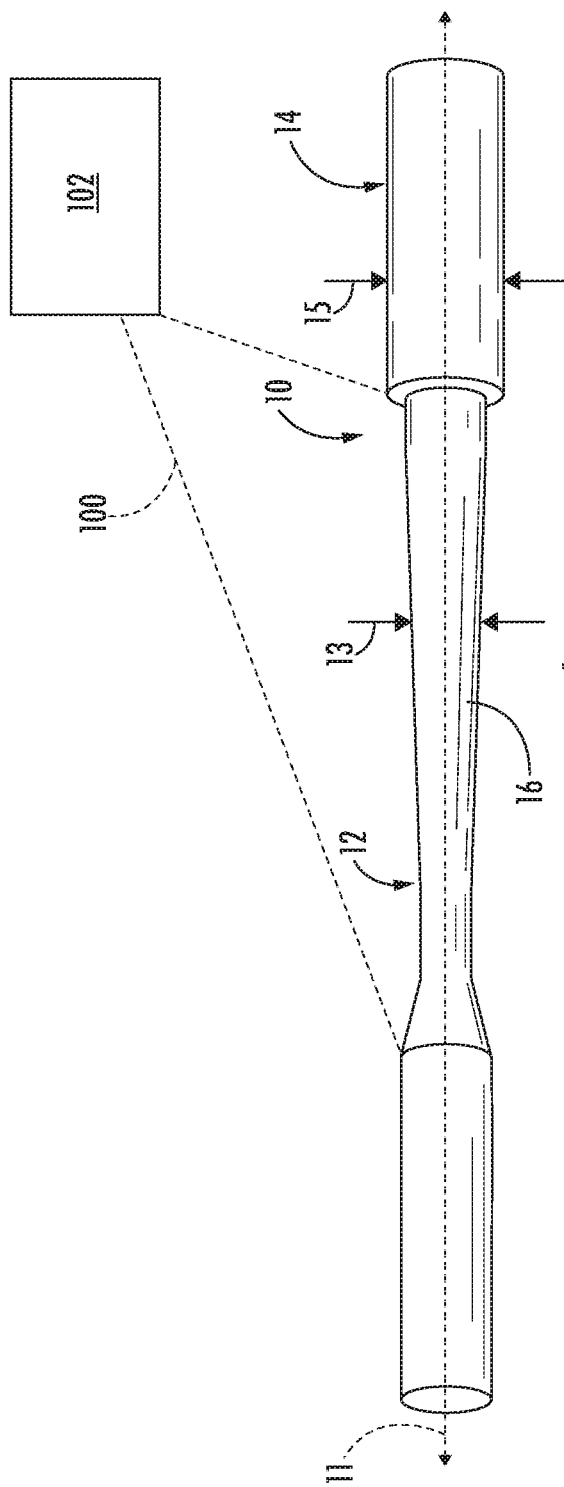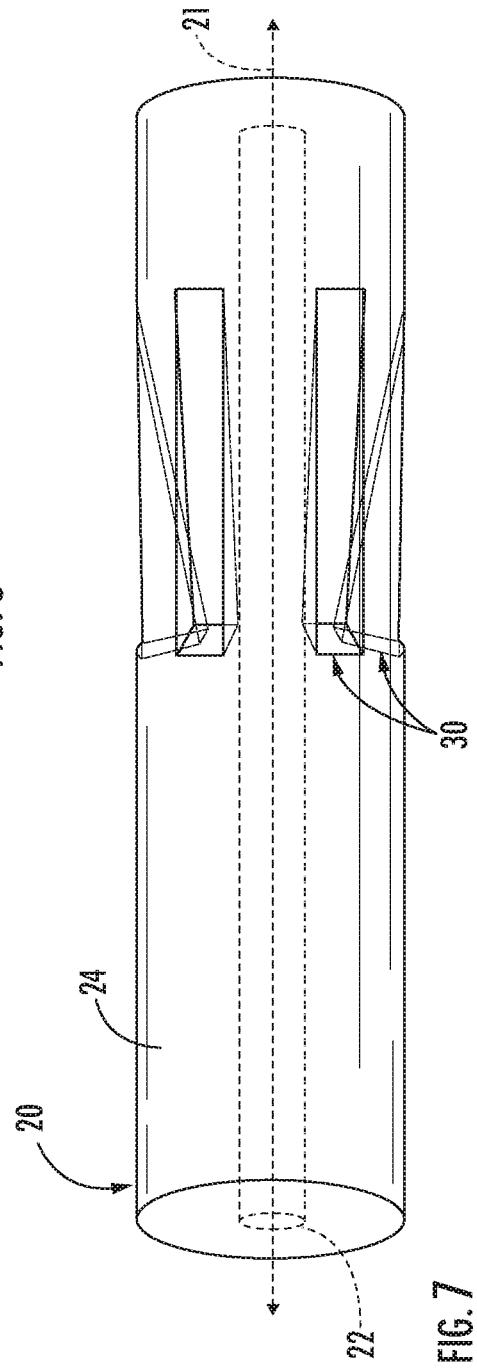
FIG. 6
FIG. 7

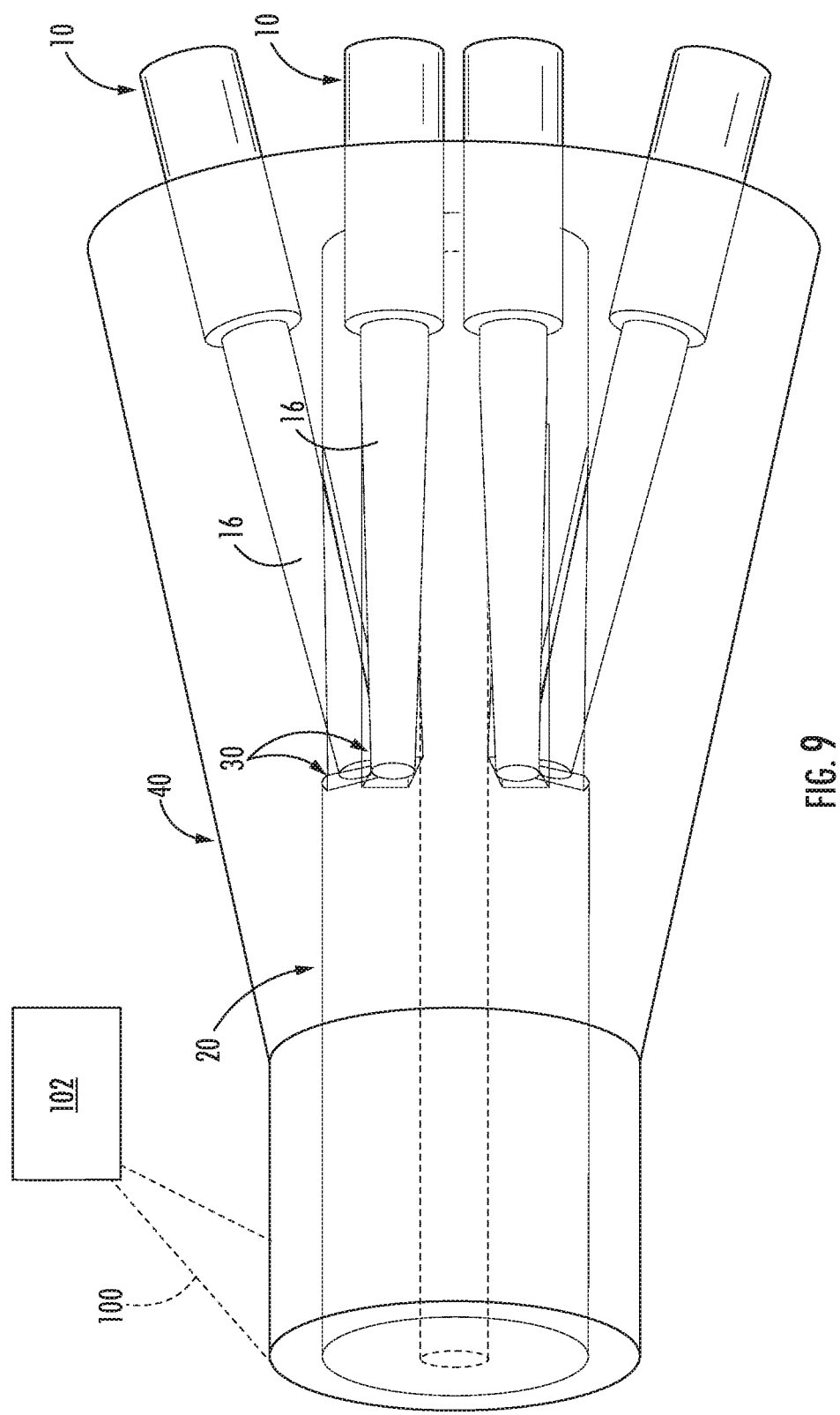

METHODS FOR FORMING SIDE-PUMPED OPTICAL FIBER COMBINERS

PRIORITY STATEMENT

The present application claims priority to U.S. Provisional Patent Application Ser. No. 62/607,703, filed Dec. 19, 2017 and which is incorporated by reference herein in its entirety.

FIELD

The present disclosure relates generally to side-pumped optical fiber combiners, and more particularly to improved methods for forming side-pumped optical fiber combiners.

BACKGROUND

Side-pumped optical fiber combiners are widely used in optical fiber laser system, such as with backward pumping to increase the pumping efficiency. Since the signal power is very high (up to multiple kW), the low loss of the signal fiber is critical.

In many cases, the input and output signal fiber is two identical fibers, or is preferably the same fiber (without any splice). Many methods have been utilized in the past to make side-pumped optical fibers combiners, such as by tapering the pump fiber and/or side-touching the signal fiber within a F-doped tube, etc. However, such known methods suffer from various disadvantages. For example, in many cases, the methods fail for lack of an effective way to bound the pump fiber into the signal fiber such that the numerical apertures match. In these cases, the pump fiber has to be tapered to a very small diameter. This will substantially increase the numerical aperture of the pump light. After coupling to the signal fiber, the high numerical aperture pump light is not be able to propagate. Other known combiners suffer from high signal losses and/or temperature increases during high power usages.

Accordingly, improved methods for forming side-pumped optical fiber combiners are desired. In particular, methods which provide combiners having low signal losses and reduced temperature increases during high power usages would be advantageous.

BRIEF DESCRIPTION

Aspects and advantages of the invention will be set forth in part in the following description, or may be obvious from the description, or may be learned through practice of the invention.

In accordance with one embodiment, a method for forming a side-pumped optical fiber combiner is provided. The method includes ablating a cladding of a signal fiber to form an angled notch in the cladding. The signal fiber includes a core and the cladding surrounding the core. The method further includes inserting a cladding-free end of a pump fiber into the angled notch. The pump fiber includes a core and a cladding, the cladding-free end including the core of the pump fiber and free from the cladding of the pump fiber. The method further includes fusing the cladding-free end to the signal fiber.

In accordance with another embodiment, a method for forming a side-pumped optical fiber combiner is provided. The method includes generating a laser beam such that the laser beam impacts and ablates the cladding of a signal fiber to form an angled notch in the cladding. The signal fiber includes a core and the cladding surrounding the core. The angled notch extends only into the cladding of the signal fiber and does not extend into the core of the signal fiber. The angled notch is longitudinally aligned with a longitudinal axis of the signal fiber. The method further includes inserting a cladding-free end of a pump fiber into the angled notch. The pump fiber includes a core and a cladding, the cladding-free end including the core of the pump fiber and free from the cladding of the pump fiber. The method further includes fusing the cladding-free end to the signal fiber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which:

FIG. 1 is a side view of a pump fiber in accordance with embodiments of the present disclosure;

FIG. 2 is a side view of a signal fiber during ablation in accordance with embodiments of the present disclosure;

FIG. 3 is a top view of an ablated signal fiber in accordance with embodiments of the present disclosure;

FIG. 4 is a side view of pump fibers inserted into notches of and being fused to a signal fiber in accordance with embodiments of the present disclosure;

FIG. 6 is a side view of a tapered pump fiber during cleaving thereof in accordance with embodiments of the present disclosure;

FIG. 7 is a side view of a signal fiber during ablation in accordance with other embodiments of the present disclosure;

FIG. 9 is a side view of a fused signal fiber and pump fibers inserted into and being fused to a capillary tube.

DETAILED DESCRIPTION

Figure 5:
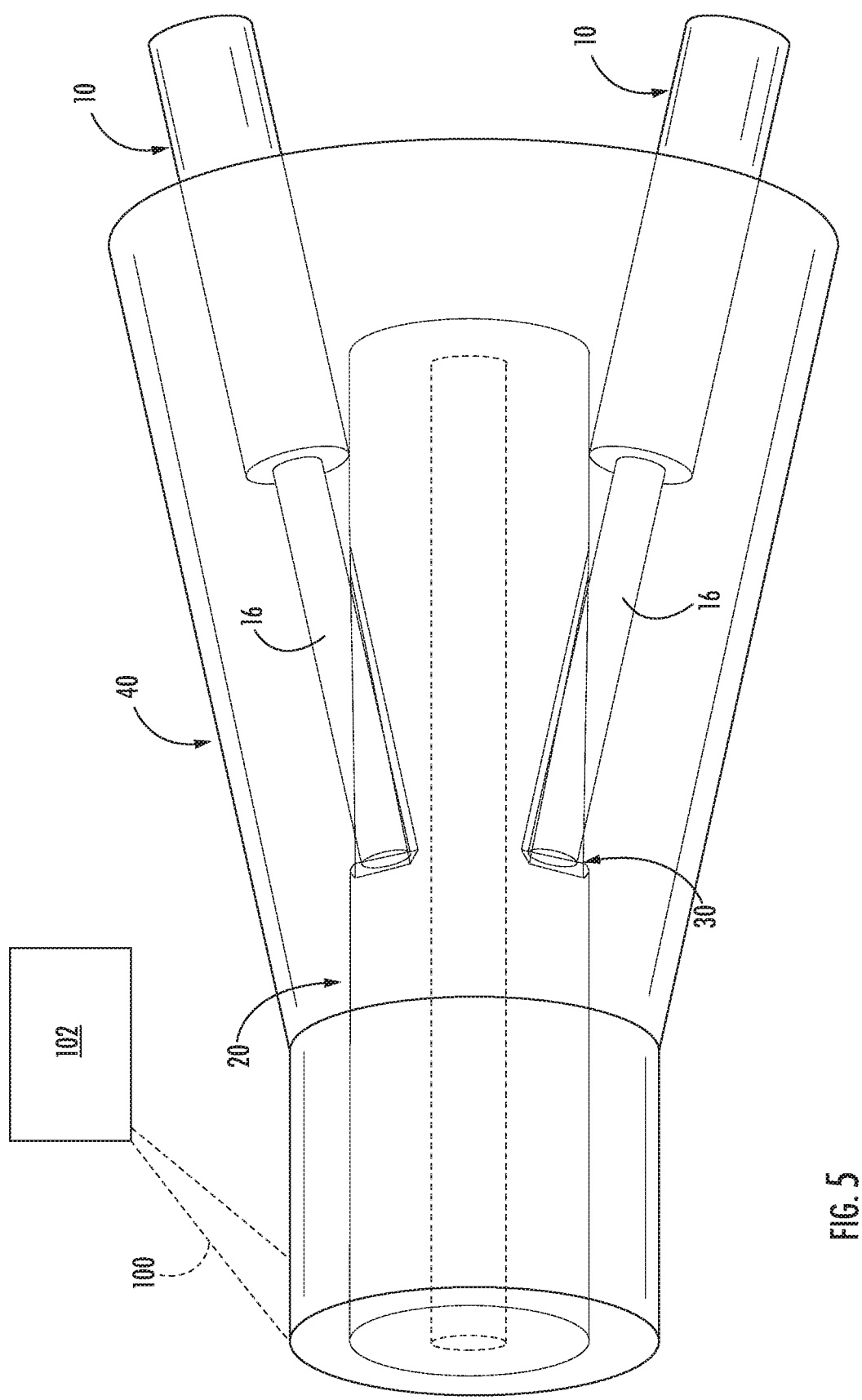
FIG. 5 is a side view of a fused signal fiber and pump fibers inserted into and being fused to a capillary tube.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 9, embodiments of side-pumped optical fiber combiners and methods for forming such combiners are provided. Using methods in accordance with the present disclosure, the signal fiber is advantageously ablated to form one or more notches in the signal fiber. The pump fiber is them inserted into the notch and fused to the signal fiber. In some cases, the assembly of the fused signal fiber and pump fiber(s) is then inserted and fused into a capillary tube for protection thereof.

Advantageously, methods in accordance with the present disclosure do not require tapering of the pump fiber(s), although tapering may be performed (in some cases advantageously with a relatively small taper ratio).

Further, advantageously, methods in accordance with the present disclosure provide combiners which have low signal losses and reduced temperature increases during high power usages.

Referring now to FIG. 1, a method in accordance with the present disclosure may include performing cladding removal of one or more pump fibers 10. A longitudinal axis 11 may be defined for the pump fiber 10, as shown. The pump fiber 10 may include a core 12 and a cladding 14 which surrounds the core 12, as is generally understood. A maximum outer diameter 13 may be defined for the core 12, and a maximum outer diameter 15 may be defined for the cladding 14. In exemplary embodiments, pump fibers 10 in accordance with the present disclosure are multi-mode optical fibers or large mode area optical fibers. Alternatively, however, other suitable optical fibers may be utilized.

Cladding removal of a pump fiber 10 includes removing at least a portion of the cladding 14 from the pump fiber 10, such that at least a portion of the core 12 is exposed and free from the cladding 14. The cladding may be removed from the entire circumference of a portion of the core 12, as shown. Cladding removal of a pump fiber 10 may form a cladding-free end 16 which includes an end and a longitudinal portion of the fiber 10 that includes only the core 12 and is free from the cladding 14. The resulting pump fiber 10 includes at least a longitudinal portion of the fiber for which the core 12 is exposed and free from cladding 14 (i.e the cladding-free end 16), although it should be understood that neighboring longitudinal portions of such fiber 10 may include a cladding 14.

Suitable methods and apparatus for cladding removal of a pump fiber 10 include, for example, mechanical polishing, acid etching, or laser ablation.

Referring now to FIG. 6, in some embodiments, include tapering the cladding-free end 16. Tapering may include, for example, heating the cladding-free end 16 and stretching at least a portion of the cladding-free end 16, such as along the longitudinal axis 11, to reduce the maximum outer diameter 13 of the cladding-free end 16 into a tapered form.

Any suitable tapering methods and/or apparatus may be utilized. In exemplary embodiments, for example, a laser 102 may generate a laser beam 100, and the laser beam 100 may be utilized for such tapering. For example, the laser beam 100 may contact and heat the cladding-free end 16 to facilitate tapering thereof. The laser 102 in exemplary embodiments is a $CO_2$ laser, and the laser beam 14 is thus in exemplary embodiments a $CO_2$ laser beam.

In some embodiments, after tapering the cladding-free end 16 to form a tapered cladding-free end as discussed herein, the cladding-free end 16 may be cleaved. Any suitable cleaving methods and/or apparatus may be utilized, such as, in exemplary embodiments, laser beam 100.

Referring now to FIGS. 2, 3, and 7, methods in accordance with the present disclosure further include ablating the cladding 24 of a signal fiber 20 to form one or more angled notches 30 in the cladding 24. A longitudinal axis 21 may be defined for the signal fiber 20, as shown. The signal fiber 20 may include a core 22 and a cladding 24 which surrounds the core 22, as is generally understood. A maximum outer diameter 23 may be defined for the core 22, and a maximum outer diameter 25 may be defined for the cladding 24. In exemplary embodiments, signal fibers 20 in accordance with the present disclosure are multi-mode optical fibers or large mode area optical fibers. Alternatively, however, other suitable optical fibers may be utilized.

In exemplary embodiments, the maximum outer diameter 25 may be greater than the maximum outer diameter 15. Further, in exemplary embodiments, the maximum outer diameter 23 may be greater than the maximum outer diameter 13.

In exemplary embodiments, the ablating step as discussed herein may be performed by generating a laser beam 100 such that the laser beam impacts and ablates the cladding 24, thus removing portions of the cladding to form the one or more angled notches 30. As discussed, in exemplary embodiments, the laser beam 100 is a $CO_2$ laser beam.

As discussed, ablation of the signal fiber 20 forms one or more angled notches 30 in the cladding 24 of the signal fiber. When more than one angled notch 30 is formed, the plurality of angled notches 30 may be defined in an annular array about the longitudinal axis 21. The angled notches 30 may, in some embodiments, be equally spaced apart in such annular array.

The angled notches 30 are defined in the cladding 24 at an angle, such that a depth 31 of a notch 30 within the cladding 24 tapers along the longitudinal axis 21, as shown in FIGS. 2 and 7. In some embodiments, for example, an angle 34 between the longitudinal axis 21 and a longitudinal axis 31 of the angled notch 30 may be between 15 degrees and 55 degrees, such as between 20 degrees and 45 degrees, such as between 20 degrees and 30 degrees. In some embodiments, one or more of the angled notches 30, such as in exemplary embodiments all of the angled notches 30, are longitudinally aligned with the longitudinal axis 21, as shown in FIG. 3.

In exemplary embodiments, the angled notch(es) 30 extend only into the cladding 24, and do not extend into the core 22 of the signal fiber 20. The core 22 may be thus be free from ablation and/or free from notches 30.

In exemplary embodiments, a maximum width 32 (which may, for example, be a diameter) of each angled notch 30 is greater than the maximum outer diameter 13 of the core 12 of the pump fiber 10 to be inserted into the notch 30. The end surface of the cladding-free end 16 may thus be fully inserted into the notch 30 and cladding 24. Further, in exemplary embodiments, the maximum width 32 may be within 10 microns, such as within 5 microns, such as within 3 microns, such as within 2 microns, of the maximum outer diameter 13 of the core 12 of the pump fiber 10 to be inserted into the notch 30.

A maximum length 36 (which may for example be longitudinally aligned with the longitudinal axis 21) may be defined for each angled notch 30, such as along the longitudinal axis 31. In exemplary embodiments, a maximum length 36 may for example be between 5 millimeters and 50 millimeters, such as between 10 millimeters and 40 millimeters, such as between 15 millimeters and 35 millimeters, such as between 20 millimeters and 30 millimeters.

Figure 8:
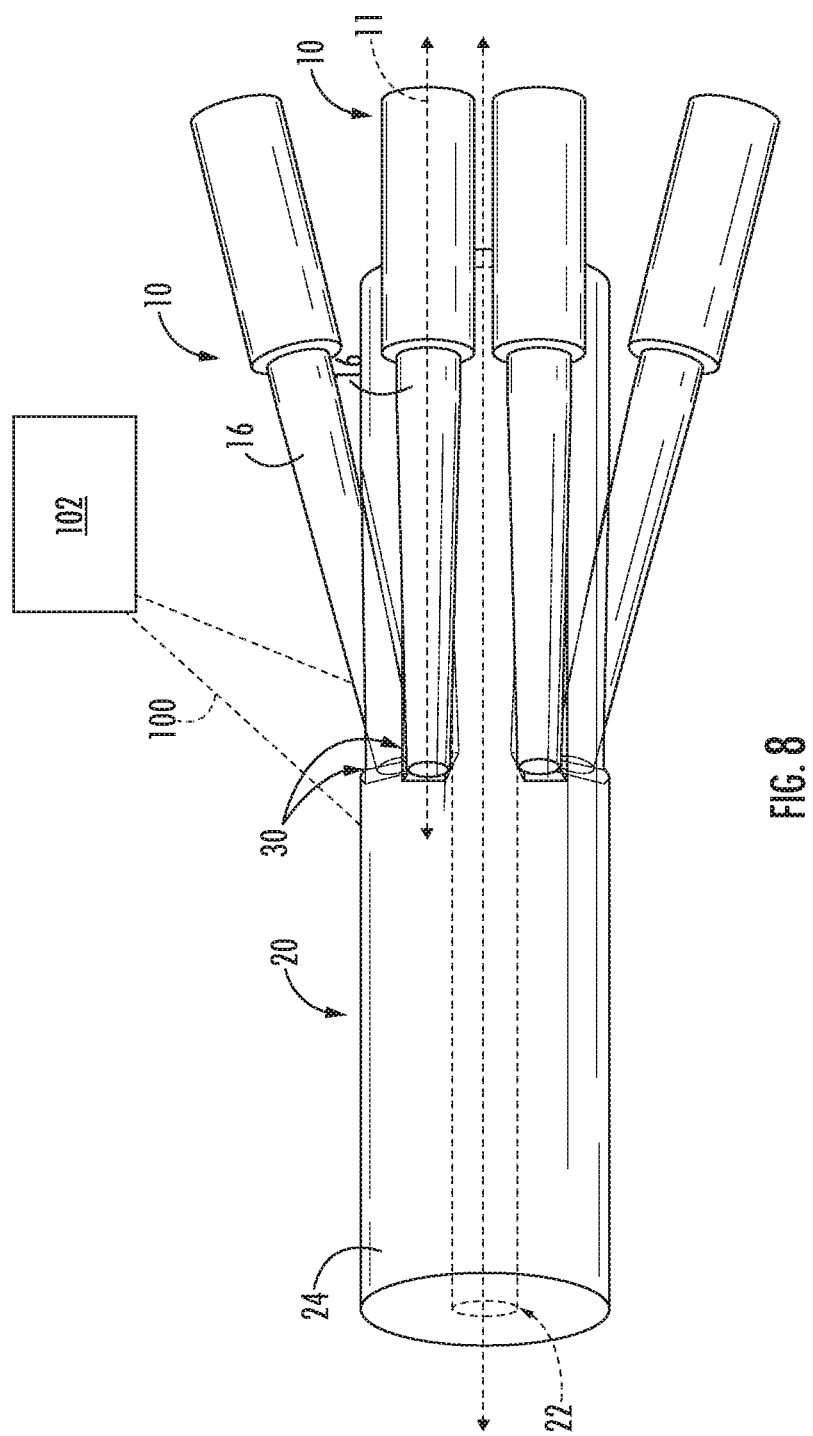
FIG. 8 is a side view of pump fibers inserted into notches of and being fused to a signal fiber in accordance with embodiments of the present disclosure.

Referring now to FIGS. 4 and 8, a method in accordance with the present disclosure may further include inserting the cladding-free end 16 of each of the one or more pump fibers 10 into one of the one or more angled notches 30. In some embodiments, only the cladding-free end 16 of a pump fiber 10 may be inserted into a notch 30, such that the cladding 14 is not disposed in the notch 30. The core 12 may contact the cladding 24 within the notch 30, with the end surface of the cladding-free end 16 contacting the end surface of the cladding 24 which defines the notch 30.

Referring still to FIGS. 4 and 8, a method in accordance with the present disclosure may further include fusing the cladding-free end 16 of each of the one or more pump fibers 10 to the signal fiber 30, such as to the cladding 24 thereof. For example, a cladding-free end 16 which is inserted in a notch 30 and at least the portion of the cladding 24 defining the notch 30 may be heated and then cooled such that the cladding-free end 16 and cladding 24 are fused together.

In exemplary embodiments, the fusing step as discussed herein may be performed by generating a laser beam 100 such that the laser beam heats the cladding-free end 16 and cladding 24. As discussed, in exemplary embodiments, the laser beam 100 is a $CO_2$ laser beam.

Referring now to FIGS. 5 and 9, in some embodiments, a method in accordance with the present disclosure may include inserting the fused signal fiber 20 and pump fiber(s) 10 into a capillary tube 40. Capillary tube 40 may be at least partially tapered, as shown. In exemplary embodiments, capillary tube 40 may be formed from a boron silica or a fused silica. Further, in exemplary embodiments, capillary tube 40 may be F-doped. When inserted into the capillary tube 40, a longitudinal length of the fused signal fiber 20 and pump fiber(s) 10 may be at least partially or in some embodiments fully surrounded by the capillary tube 40. In exemplary embodiments, when inserted into the capillary tube 40, a longitudinal length of the signal fiber 20 may be fully surrounded by the capillary tube 40.

Referring still to FIGS. 5 and 9, a method in accordance with the present disclosure may further include fusing the signal fiber 20, such as the cladding 24 thereof, to the capillary tube 40. For example, a portion of the cladding 24 (which may for example include an end of the signal fiber 20) and a portion of the capillary tube 40 may be heated and then cooled such that the signal fiber 20 and capillary tube 40 are fused together.

In exemplary embodiments, the fusing step as discussed herein may be performed by generating a laser beam 100 such that the laser beam heats the signal fiber 20 and capillary tube 40. As discussed, in exemplary embodiments, the laser beam 100 is a $CO_2$ laser beam.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a side-pumped optical fiber combiner,
   the method comprising:
   ablating a cladding of a signal fiber to form an angled notch in the cladding, the signal fiber comprising a core and the cladding surrounding the core;
   inserting a cladding-free end of a pump fiber into the angled notch, the pump fiber comprising a core and a cladding, the cladding-free end comprising an end and a longitudinal portion of the core of the pump fiber free from the cladding of the pump fiber; and
   fusing the cladding-free end to the signal fiber.

2. The method of claim 1, wherein the angled notch extends only into the cladding of the signal fiber and does not extend into the core of the signal fiber.

3. The method of claim 1, wherein the angled notch is longitudinally aligned with a longitudinal axis of the signal fiber.

4. The method of claim 1, wherein the angled notch extends into the cladding at an angle of between 15 degrees and 55 degrees from a longitudinal axis of the signal fiber.

5. The method of claim 1, wherein a maximum width of the angled notch is greater than a maximum outer diameter of the core of the pump fiber.

6. The method of claim 5, wherein the maximum width of the angled notch is within 10 microns of the maximum outer diameter of the core of the pump fiber.

7. The method of claim 1, wherein a maximum length of the angled notch is between 5 millimeters and 50 millimeters.

8. The method of claim 1, further comprising performing cladding removal of the pump fiber to form the cladding-free end.

9. The method of claim 1, wherein the ablating step is performed by generating a laser beam such that the laser beam impacts and ablates the cladding of the signal fiber.

10. The method of claim 9, wherein the laser beam is a CO2 laser beam.

11. The method of claim 1, further comprising:
    inserting the fused signal fiber and pump fiber into a capillary tube; and
    fusing the signal fiber to the capillary tube.

12. The method of claim 1, wherein the angled notch is a plurality of angled notches and the pump fiber is a plurality of pump fibers, and wherein the angled notches are defined in an annular array about a longitudinal axis of the signal fiber.

13. A method for forming a side-pumped optical fiber combiner,
    the method comprising:
    generating a laser beam such that the laser beam impacts and ablates a cladding of a signal fiber to form an angled notch in the cladding, the signal fiber comprising a core and the cladding surrounding the core, wherein the angled notch extends only into the cladding of the signal fiber and does not extend into the core of the signal fiber, and wherein the angled notch is longitudinally aligned with a longitudinal axis of the signal fiber;
    inserting a cladding-free end of a pump fiber into the angled notch, the pump fiber comprising a core and a cladding, the cladding-free end comprising an end and a longitudinal portion of the core of the pump fiber free from the cladding of the pump fiber; and
    fusing the cladding-free end to the signal fiber.

14. The method of claim 13, wherein the angled notch extends into the cladding at an angle of between 15 degrees and 55 degrees from a longitudinal axis of the signal fiber.

15. The method of claim 13, wherein a maximum width of the angled notch is greater than a maximum outer diameter of the core of the pump fiber.

16. The method of claim 15, wherein the maximum width of the angled notch is within 10 microns of the maximum outer diameter of the core of the pump fiber.

17. The method of claim 13, wherein a maximum length of the angled notch is between 5 millimeters and 50 millimeters.

18. The method of claim 13, further comprising performing cladding removal of the pump fiber to form the cladding-free end.

19. The method of claim 13, wherein the laser beam is a $CO_2$ laser beam.

20. The method of claim 13, further comprising:
inserting the fused signal fiber and pump fiber into a capillary tube; and
fusing the signal fiber to the capillary tube.

\* \* \* \* \*